US007623485B2

(12) United States Patent
Bae et al.

(10) Patent No.: US 7,623,485 B2
(45) Date of Patent: Nov. 24, 2009

(54) METHOD FOR PROVIDING USER INTERFACE USING RECEIVED TERRESTRIAL DIGITAL BROADCASTING DATA IN A MOBILE COMMUNICATION TERMINAL

(75) Inventors: Jun-Ik Bae, Daegu (KR); Kang-Wook Kim, Daegu (KR)

(73) Assignee: Samsung Electronics Co., Ltd (KR)

( * ) Notice: Subject to any disclaimer, the term of this patent is extended or adjusted under 35 U.S.C. 154(b) by 534 days.

(21) Appl. No.: 11/331,224

(22) Filed: Jan. 12, 2006

(65) Prior Publication Data

US 2006/0271991 A1 Nov. 30, 2006

(30) Foreign Application Priority Data

May 30, 2005 (KR) ...................... 10-2005-0045838

(51) Int. Cl.
*H04W 4/00* (2006.01)

(52) U.S. Cl. .................... 370/328; 370/329; 455/422.1; 455/150.1

(58) Field of Classification Search ................. 370/328, 370/329; 455/422.1, 150.1, 131
See application file for complete search history.

(56) References Cited

U.S. PATENT DOCUMENTS 5,875,178 A * 2/1999 Rahuel et al. ............... 370/313
6,075,789 A * 6/2000 Kasslin et al. .............. 370/338
6,078,592 A * 6/2000 Spiero ........................ 370/474
6,094,661 A * 7/2000 Salomaki ................. 707/104.1
6,415,135 B1 * 7/2002 Salomaki ..................... 455/45
2004/0022326 A1 2/2004 Morrish et al.
2005/0015162 A1 * 1/2005 Omura et al. ................. 700/94
2005/0054286 A1 * 3/2005 Kanjilal et al. ............. 455/3.05
2005/0055714 A1 3/2005 Lee
2005/0226354 A1 * 10/2005 Shin et al. ................... 375/346
2005/0232136 A1 * 10/2005 Kwak ......................... 370/208

FOREIGN PATENT DOCUMENTS

EP 0 969 676 A2 1/2000
EP 1 528 700 A2 5/2005
JP 2005-045819 A 2/2005

* cited by examiner

*Primary Examiner*—Joseph H Feild
*Assistant Examiner*—Huy D Nguyen
(74) *Attorney, Agent, or Firm*—The Farrell Law Firm, LLP

(57) ABSTRACT

Disclosed is a method for creating a user interface in a mobile communication terminal receiving terrestrial digital broadcasting data, which includes receiving digital broadcasting data corresponding to a specific frequency in response to request for the digital broadcasting corresponding to the specific frequency; separating a Main Service Channel (MSC) including broadcasting data according to each sub-channel and a Fast Information Channel (FIC) representing information of the MSC; acquiring analysis information by sequentially analyzing the separated FIC by preset predetermined frames each time; and creating a user interface menu for sub-channels of the MSC by means of the acquired analysis information. According to the a method, a mobile communication terminal receives terrestrial digital broadcasting data and efficiently creates a user interface, so that users can conveniently watch terrestrial digital broadcasting through the mobile communication terminal.

24 Claims, 18 Drawing Sheets

| | FIG type number | FIG type | FIG application |
|---|---|---|---|
| √ | 0 | 000 | MCI and part of the SI |
| √ | 1 | 001 | Labels, etc. (part of the SI) |
| | 2 | 010 | Reserved |
| | 3 | 011 | Reserved |
| | 4 | 100 | Reserved |
| | 5 | 101 | FIC Data Channel (FIDC) |
| | 6 | 110 | Conditional Access (CA) |
| | 7 | 111 | In house (except for Length 31) |

FIG.5B

METHOD FOR PROVIDING USER INTERFACE USING RECEIVED TERRESTRIAL DIGITAL BROADCASTING DATA IN A MOBILE COMMUNICATION TERMINAL

PRIORITY

This application claims priority to an application entitled "Method For Providing User Interface Using Received Terrestrial Digital Broadcasting Data in Mobile Communication Terminal" filed in the Korean Intellectual Property Office on May 30, 2005 and assigned Serial No. 2005-45838, the contents of which are incorporated herein by reference.

BACKGROUND OF THE INVENTION

1. Field of the Invention

The present invention relates to a mobile communication terminal, and more particularly to a method for providing a user interface by means of received terrestrial digital broadcasting data in a mobile communication terminal.

2. Description of the Related Art

Typically, digital broadcasting provides users with services of high picture and speech quality, in contrast with conventional analog broadcasting. Further, digital broadcasting may be classified into satellite digital broadcasting and terrestrial digital broadcasting.

Satellite digital broadcasting aims at providing a mobile service which enables uses to watch multi-channel multimedia broadcasting through a portable receiver (cell phone, personal digital assistant, etc.) or a vehicle receiver regardless of time and place.

Terrestrial digital broadcasting having been developed from Digital Audio Broadcasting (DAB), provides mobile multimedia broadcasting through a $12^{th}$ channel the of VHF band which is currently empty. Terrestrial digital broadcasting represents broadcasting for synthetically transmitting television broadcasting, radio broadcasting and data broadcasting. Existing terrestrial broadcasters have used one analog channel. However, digital broadcasters have used a plurality of digital channels and this will be referred to as an "ensemble".

In terrestrial digital broadcasting, one VHF channel may transmit three ensembles and one ensemble may provide one video channel, two audio channels and one data channel. The terrestrial digital broadcasting targets free broadcasting in expectation of use in vehicles. Further, eight broadcasters including not only KBS, MBC, SBS but also CBS, YTN, Digital Sky Net providing Sky Life with audio channels, etc., have been preparing the terrestrial digital broadcasting.

With the recent development of digital broadcasting technology and mobile communication technology, interest in a digital broadcasting service capable of allowing users to watch digital broadcasting during movement has increased. Specifically, interest in a Digital Multimedia Broadcasting (DMB) service using a mobile communication terminal has increased.

Accordingly, when terrestrial digital broadcasting services are provided, it is necessary to provide a user interface to permit users to efficiently watch the terrestrial digital broadcasting having various channels through mobile communication terminals.

SUMMARY OF THE INVENTION

Accordingly, the present invention has been made to solve the above-mentioned problems occurring in the prior art, and it is an object of the present invention to provide a method for enabling users of mobile communication terminals receiving terrestrial digital broadcasting data to conveniently watch terrestrial digital broadcasting.

It is another object of the present invention to provide a method for efficiently providing a user interface using received terrestrial digital broadcasting data in a mobile communication terminal.

In order to accomplish the aforementioned objects, according to one aspect of the present invention, there is provided a method for creating a user interface in a mobile communication terminal receiving terrestrial digital broadcasting data, the method including receiving digital broadcasting data corresponding to a specific frequency in response to a request for the digital broadcasting corresponding to the specific frequency; separating a Main Service Channel (MSC) including broadcasting data according to each sub-channel and a Fast Information Channel (FIC) representing information of the MSC; acquiring analysis information by sequentially analyzing the separated FIC by preset predetermined frames each time; and creating a user interface menu for sub-channels of the MSC by means of the acquired analysis information.

Preferably, the method of the present invention further includes displaying the created user interface menu.

More preferably, the method of the present invention further includes outputting broadcasting data of a predetermined sub-channel when the predetermined sub-channel is selected through the user interface menu for the sub-channels of the MSC.

BRIEF DESCRIPTION OF THE DRAWINGS

The above and other objects, features and advantages of the present invention will be more apparent from the following detailed description taken in conjunction with the accompanying drawings, in which:

FIGS. 5A and 5B illustrates the configuration of an FIC required when a mobile communication terminal creates a user interface according to an embodiment of the present invention;

DETAILED DESCRIPTION OF THE PREFERRED EMBODIMENT

Hereinafter, a preferred embodiment according to the present invention will be described with reference to the accompanying drawings. In the following description, a detailed description of known functions and configurations incorporated herein will be omitted when it may obscure the subject matter of the present invention.

Figure 1:
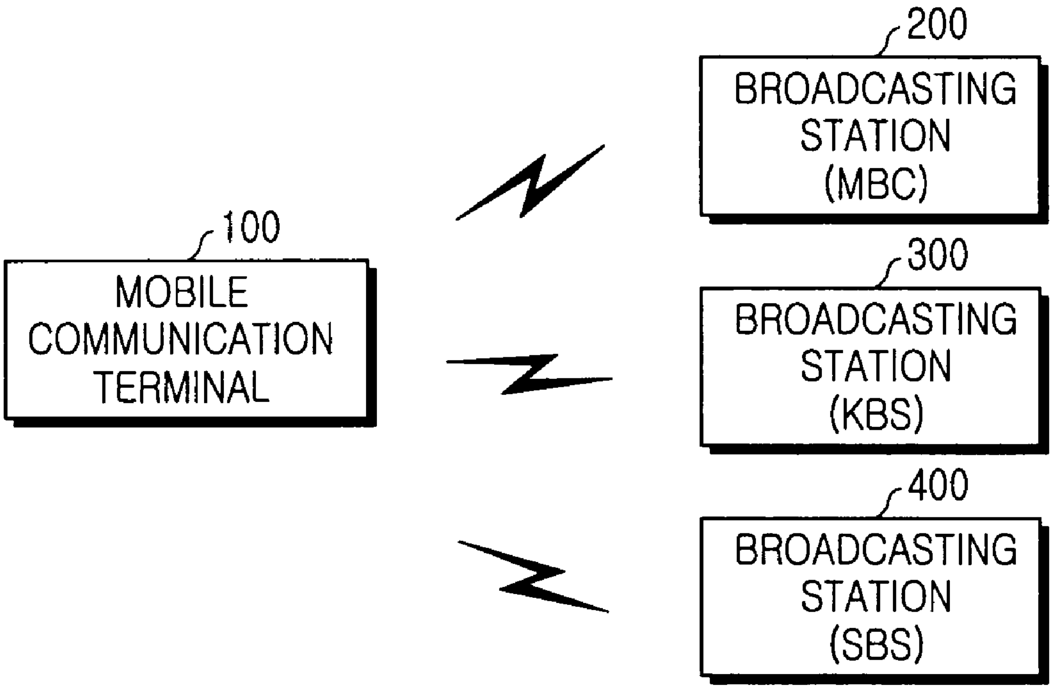
FIG. 1 is a block diagram illustrating the construction of a system for providing a terrestrial digital broadcasting service to which the present invention is applied.

FIG. 1 is a block diagram illustrating the construction of a system for providing a terrestrial digital broadcasting service to which the present invention is applied. In FIG. 1, a mobile communication terminal is a terminal capable of receiving terrestrial digital broadcasting.

Referring to FIG. 1, the mobile communication terminal 100 is capable of receiving terrestrial digital broadcasting, and receives digital broadcasting data from broadcasting stations 200, 300 and 400 transmitting digital broadcastings having specific frequencies, and outputs the received digital broadcasting data through a display unit and a speaker, thereby providing users with a digital broadcasting service.

Hereinafter, a transmit frame of the terrestrial digital broadcasting will be described with reference to FIG. 2.

Figure 2:
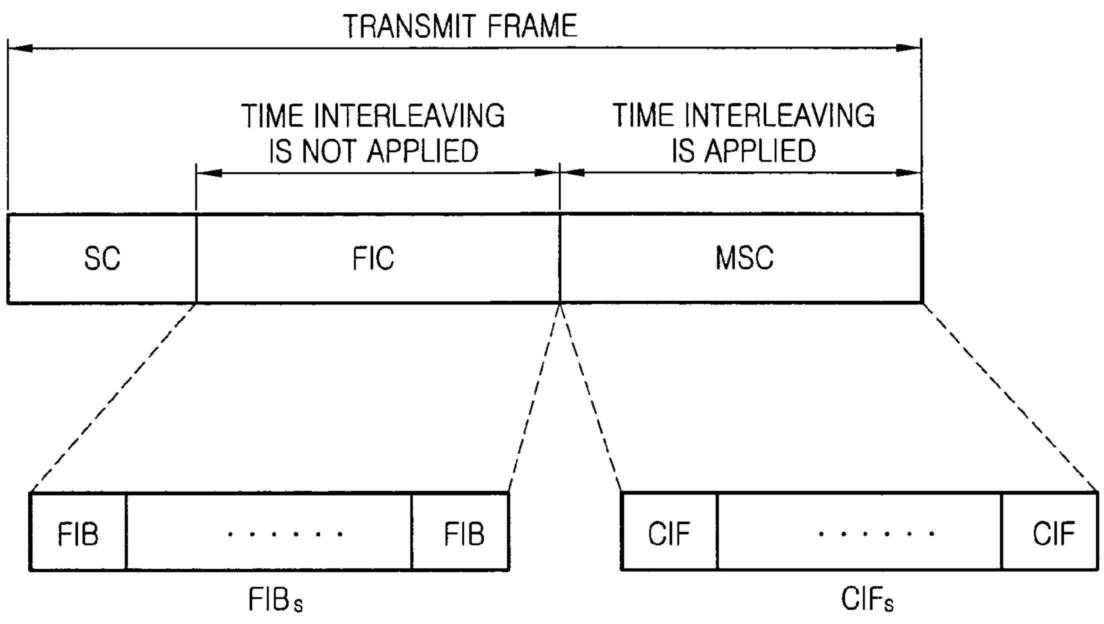
FIG. 2 illustrates a transmit frame structure of terrestrial digital broadcasting to which the present invention is applied.

Referring to FIG. 2, the transmit frame structure of the terrestrial digital broadcasting is identical to that of digital radio broadcasting, and includes four structures according to transmission modes. This is clear because the terrestrial digital broadcasting has been developed from Digital Audio Broadcasting (DAB).

The transmit frame of the terrestrial digital broadcasting includes three channels, i.e., a Synchronization Channel (SC), a Fast Information Channel (FIC) and a Main Service Channel (MSC).

The transmit frame of the FIC is 96 ms and 12 Fast Information Blocks (FIBs) exist in one frame. Further, the transmit frame of the FIC transfers control information required for analyzing the construction of the MSC. The core part of the control information is Multiplex Configuration Information (MCI) including information about a multiplex structure and a re-multiplex structure if necessary. Additional information which may be inserted into the FIC includes Service Information (SI), Conditional Access (CA) management information and a Fast Information Data Channel (FIDC).

The MSC includes a Common Interleaved Frame (CIF) sequence. One CIF has a data unit of 55, 296 bits and is transmitted every 24 ms. The smallest unit used for address allocation in the CIF is a Capacity Unit (CU) and one CU is 64 bits.

Plural CUs are connected to form one MSC which is a basic transmission unit. This will be referred to as a sub-channel. Accordingly, the MSC is comprised of multiple sub-channels, which include a video, audio and data channel.

The MCI is transferred to the FIC and provides configuration information for terrestrial digital broadcasting multiplexing.

Hereinafter, a configuration of the terrestrial digital broadcasting multiplexing will be described with reference to FIG. 3.

Figure 3:
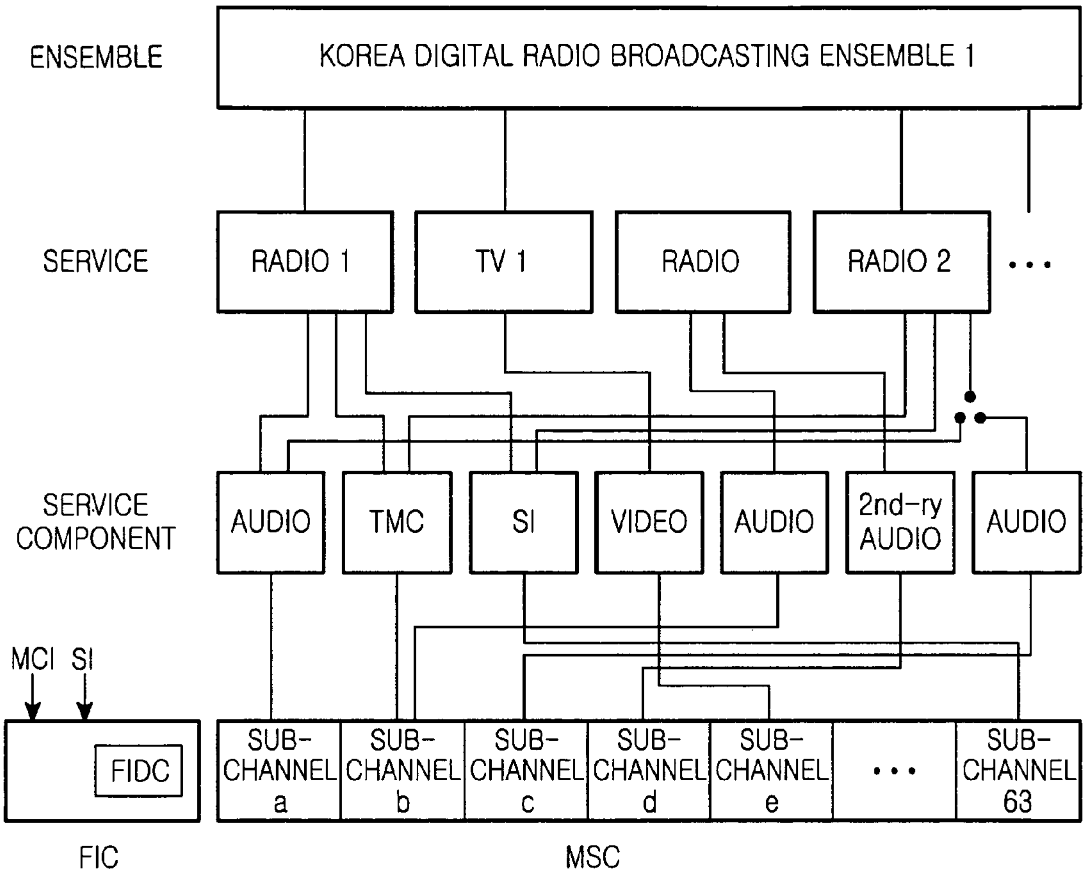
FIG. 3 illustrates the configuration of terrestrial digital broadcasting multiplexing to which the present invention is applied.

Referring to FIG. 3, the MCI provides a sub-channel configuration, an available service list in an ensemble, connection information for services and service components, connection information for sub-channels and service components, and multiplex reconfiguration management information. The ensemble may be described as a set of broadcasting services in which various services including radio and data broadcasting of still and dynamic images and voice, like a set of signals having different characteristics, can be transmitted from one multiplexer and received through a receiver, i.e., the ensemble is the uppermost container comprised of audio, video and data services of digital broadcasting.

Figure 4:
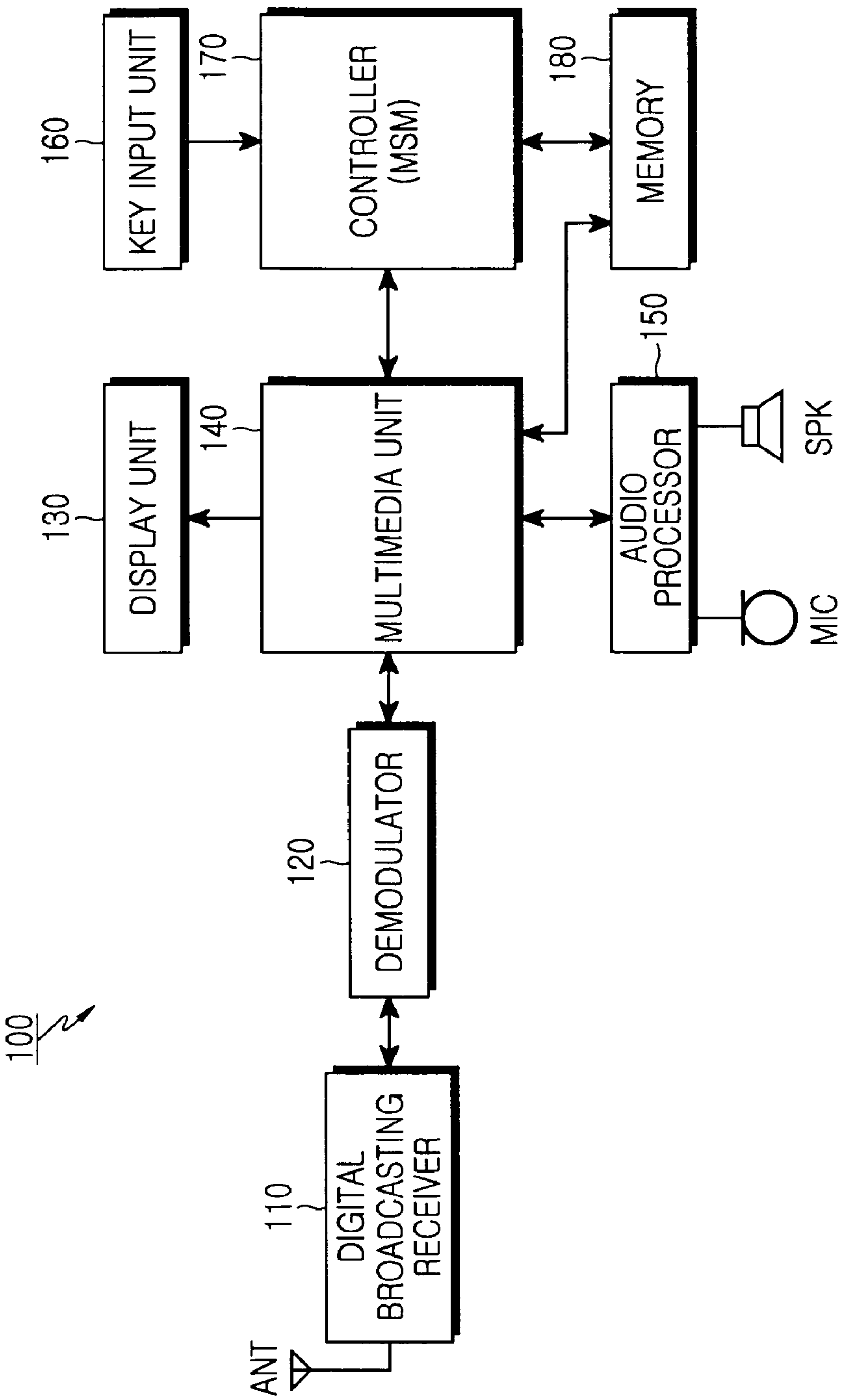
FIG. 4 is a block diagram illustrating the construction of a mobile communication terminal according to an embodiment of the present invention.

FIG. 4 is a block diagram illustrating the construction of the mobile communication terminal according to an embodiment of the present invention. The mobile communication terminal 100 includes a digital broadcasting receiver 110, a demodulator 120, a display unit 130, a multimedia unit 140, an audio processor 150, a key input unit 160, a controller (e.g., MSM 6500) 170, and a memory 180.

The digital broadcasting receiver 110 receives digital broadcasting data of specific frequencies from predetermined broadcasting stations (e.g., MBC, KBS, SBS) under the control of the controller 170. The demodulator 120 separates an MSC including broadcasting data according to each sub-channel (i.e., each video channel, each audio channel and each data channel) and FICs representing information of the MSC from the received digital broadcasting data. The MSC includes broadcasting data {i.e., actual audio/video data (MPEG2-TS)}. It is preferred that the demodulator 120 includes a buffer for storing the separated FICs.

The display unit 130 may include a Liquid Crystal Display (LCD), and displays the digital broadcasting data received in the digital broadcasting receiver 110 under the control of the controller 170. According to the present invention, the display unit 130 displays a user interface menu which is created by the controller 170 through analysis of the FICs, thereby enabling a user to select a desired sub-channel item through the key input unit 160. The display unit 130 may also output On Screen Display (OSD) display data according to screen sizes displayed through an image processor including an OSD function.

For example, when a digital broadcasting request corresponding to a specific frequency of a predetermined broadcasting station is received from a user, the multimedia unit 140 sets the frequency of the digital broadcasting receiver 110 as the specific frequency under the control of the controller 170. Accordingly, the digital broadcasting receiver 110 can receive digital broadcasting data of a broadcasting station desired by the user.

The multimedia unit 140 leads the FICs separated by the demodulator 120 from the digital broadcasting data of the broadcasting station desired by the user, and bypasses the FICs to the controller 170. The multimedia unit 140 parses the broadcasting data according to each sub-channel and outputs the parsed broadcasting data through the display unit 130 and the audio processor 150 under the control of the controller 170. Further, the multimedia unit 140 may include a separate memory for storing both predetermined broadcasting data of the broadcasting data according to each sub-channel and the FICs led from the demodulator 120, or may also transmit the predetermined broadcasting data to the memory 180 for storage. The audio processor 150 may include a codec, and the codec has a data codec for processing packet data, etc., and an audio codec for processing audio signals including voice, etc. The audio processor 150 modulates electrical signals input from a microphone in order to generate voice data, demodulates encoded voice data input from a radio transmission/ reception unit or the digital broadcasting receiver 110 into electrical signals, and outputs the electrical signals to a speaker.

It is preferred that the audio processor 150 includes a codec in order to convert digital audio signals received in the radio transmission/reception unit or the digital broadcasting receiver 110 into analog signals for reproduction, and convert analog audio signals generated from the microphone into digital audio signals. The codec is comprised of a data codec for processing packet data, and an audio codec for processing audio signals including voice. The codec may also be included in the controller 170.

The key input unit 160 has a key matrix structure, includes a text key, a number key and various function keys, and outputs key input signals corresponding to keys input by the user to the controller 170.

The controller 170 controls the general operation of the mobile communication terminal 100 according to the present invention. When a digital broadcasting request (e.g., KBS selection) of a specific frequency transmitted from a predetermined broadcasting station is received from the user, the controller 170 transmits corresponding broadcasting station information (i.e., the specific frequency information of the corresponding broadcasting station) stored in the memory 180 to the multimedia unit 140.

The controller 170 stores analysis information obtained by analyzing the FICs output (i.e., bypassed) from the multimedia unit 140 in the memory 180, and creates the user interface menu for the sub-channels of the MSC by means of the stored analysis information.

It is preferred that the controller 170 sequentially receives the separated FICs from the multimedia unit 140 by preset predetermined frames (e.g., two frames) each time, analyzes the received FICs, and acquires the analysis information. In this case, when a leading request for the FICs of 10 frames is received from the controller 170, the multimedia unit 140 stores the FICs of 10 continuous frames separated by the demodulator 120 in a memory. It is preferred that this memory is separately provided in the multimedia unit 140.

It is preferred that the controller 170 sequentially receives the separated FICs from the multimedia unit 140 by the predetermined frames each time and analyzes the received FICs, because it is possible to achieve efficient analysis of the FICs in the above-described manner.

A method for analyzing the FICs by the controller 170 will be described later with reference to FIGS. 7A to 7C.

The analysis information obtained by analyzing the FICs includes an ensemble label representing the name of a broadcasting station, a service label representing a channel name (e.g., KBS channel 1, KBS channel 2), a service ID for identifying services, a data type of a service for identifying audio, video and data, IDs of service components representing factors (e.g., factors representing predetermined broadcasting data including audio and video data) constituting a service, a sub-channel ID for identifying sub-channels, a sub-channel start address, and a sub-channel size. The service label includes a program service (e.g., audio service) label and a data service (e.g., video, data) label. The program service label represents an audio service name (audio channel name) and the data service label represents a video service name and a data service name.

Accordingly, the controller 170 can understand the sub-channel corresponding to a video channel, an audio channel or a data channel, a construction of a sub-channel title, etc., through the analysis information obtained by analyzing the FICs, and can use this when creating the user interface menu. When creating the user interface menu, it is preferred that the controller 170 employs the digital broadcasting data transmitted from the predetermined broadcasting station as items according to each sub-channel.

After the created user interface menu is displayed on the display unit 130, when a predetermined sub-channel item (e.g., a video channel) is selected through the displayed user interface menu, the controller 170 transmits the data type and ID of the selected sub-channel to the multimedia unit 140, thereby controlling corresponding broadcasting data (e.g., the movie "friend") to be output.

The multimedia unit 140 may also directly analyze the FICs and transmit analysis information obtained through the analysis to the controller 170, instead of leading the FICs separated by the demodulator 120 and bypassing the FICs to the controller 170.

Further, the multimedia unit 140 may also directly create the user interface menu by means of the analysis information and display the user interface menu on the display unit 130, instead of transmitting the analysis information to the controller 170.

The memory 180 stores various information required for controlling the operation of the mobile communication terminal 100 according to the present invention. The memory 180 stores the frequency information of the predetermined broadcasting stations transmitting the digital broadcasting corresponding to the specific frequency. Further, the memory 180 stores the analysis information obtained through the analysis of the FICs by the controller 170 in order to create the user interface menu.

Hereinafter, a configuration of the FIC will be described in order to describe an analysis method of the FIC by the controller 170.

Figure 5A:
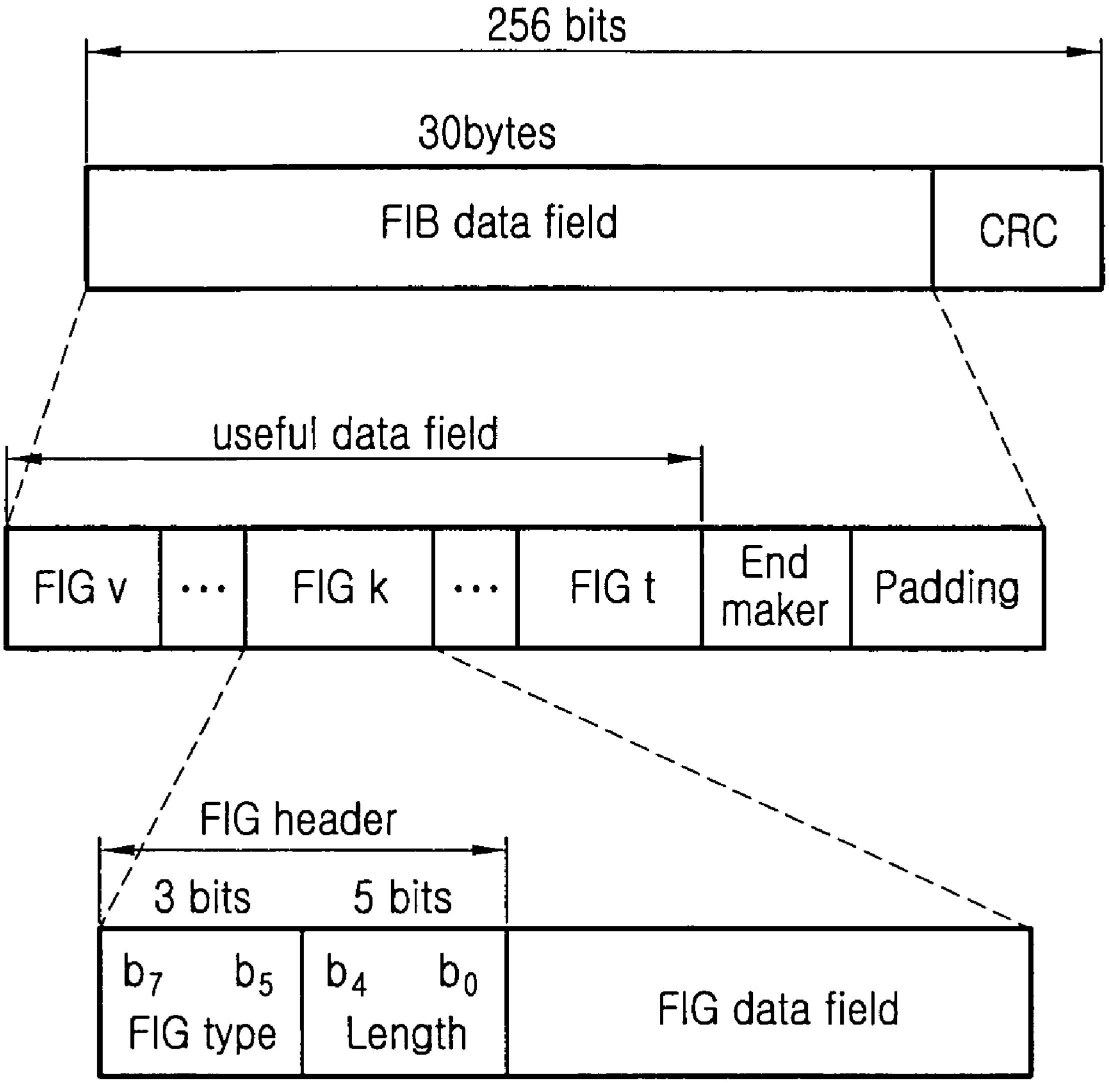

FIGS. 5A and 5B illustrates the configuration of the FIC required when the mobile communication terminal creates a user interface according to the embodiment of the present invention.

Referring to FIGS. 5A and 5B, 12 FIBs constituting the FIC have the structure as illustrated in FIG. 5A. The FIB is comprised of Fast Information Groups (FIGs) and each FIG includes a header and a field. The header of the FIG has a type and a length of the FIG, and the type has eight detailed types as illustrated in FIG. 5B. The length of the FIG represents the length of FIG data.

From among the eight types of the FIG as illustrated in FIG. 5B, types of the FIG required when the controller of the mobile communication terminal creates the user interface according to the present invention are 0 and 1 as marked in FIG. 5B.

Accordingly, only the two types will be described with reference to FIGS. 6A to 6H, which illustrates the data field structure of the FIC required when the mobile communication terminal creates the user interface according to the present invention.

Figure 6A:
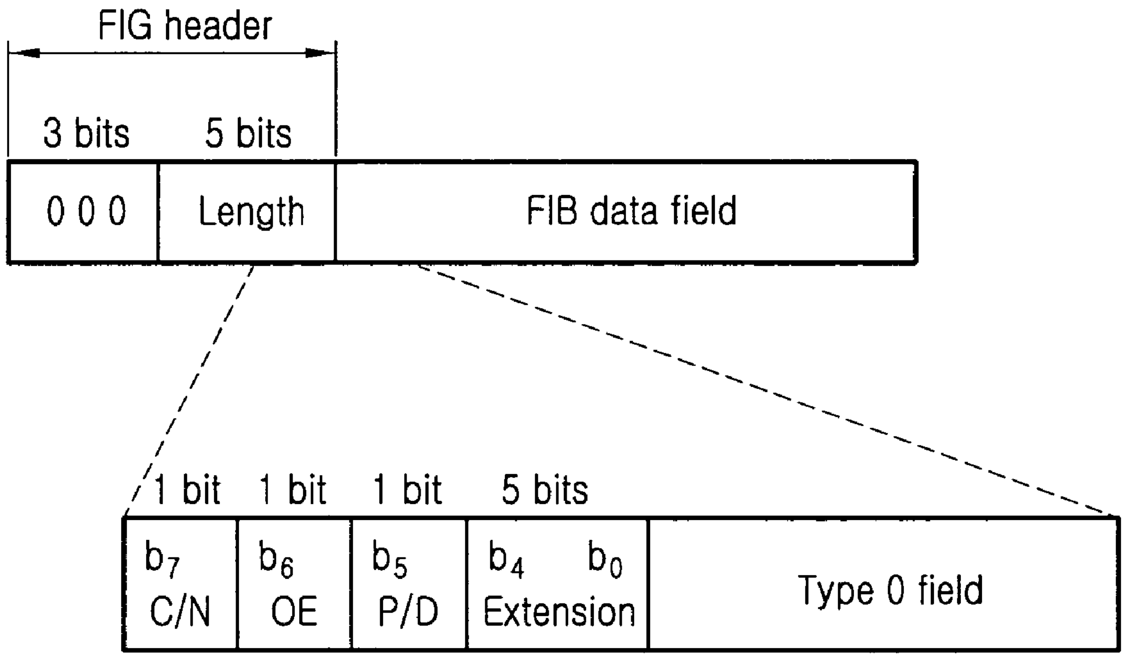
FIGS. 6A to 6H illustrates the data field structure of an FIC required when a mobile communication terminal creates a user interface according to an embodiment of the present invention.

FIG. 6A illustrates the data field structure of the FIG type 0. The FIG type 0 may be classified into about 32 types by an extension. When the FIG has a type of 0, information required when the controller of the mobile communication terminal creates the user interface according to the present invention includes extensions 1 to 3. Accordingly, only the extensions 1 to 3 will be described.

Figure 6B:
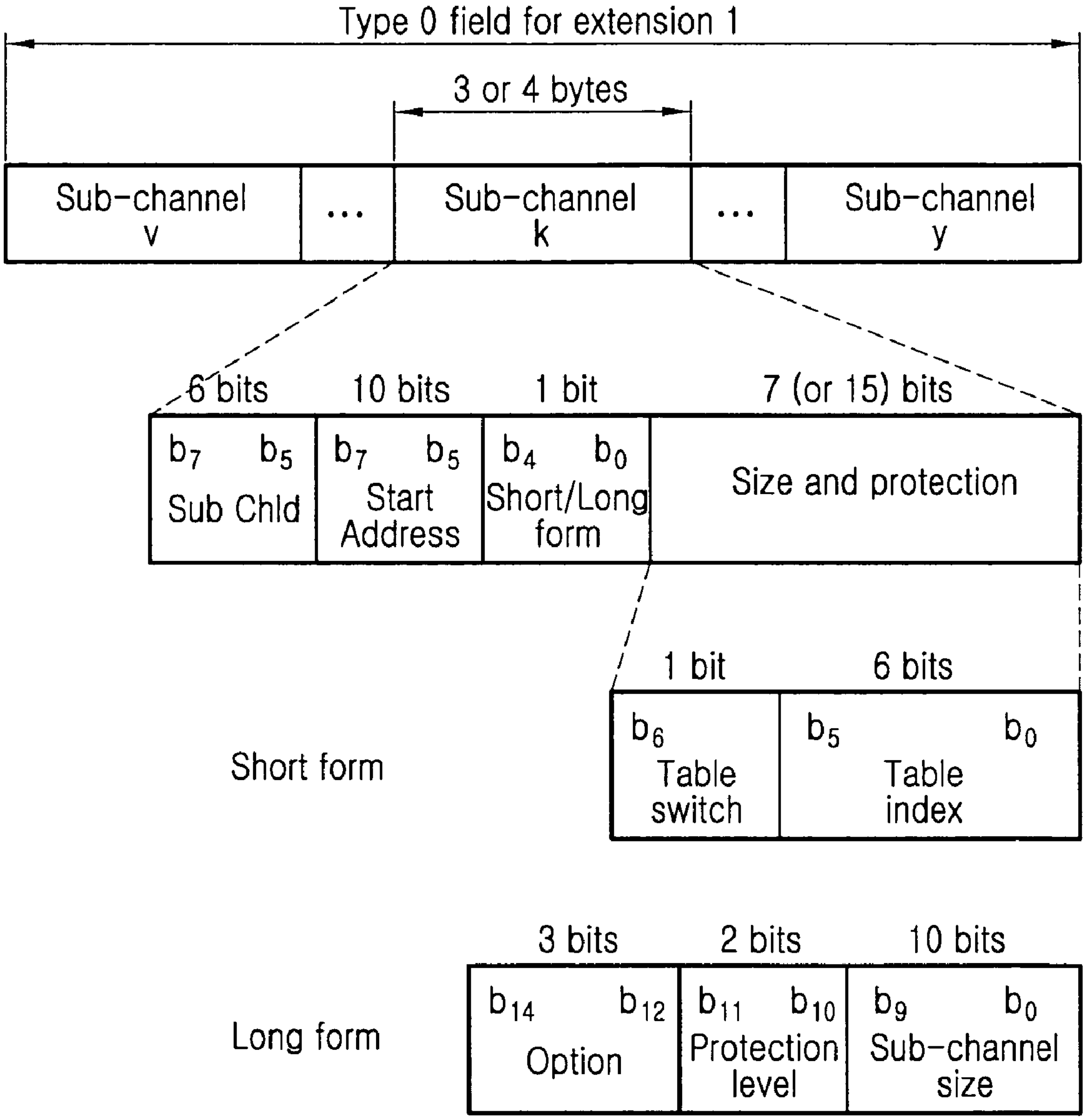

FIG. 6B illustrates the structure of a sub-channel organization field including information regarding the organization of a sub-channel when the FIG has a type of 0 and an extension of 1. The mobile communication terminal 100 can understand an ID, a start address and a size of the sub-channel through the structure shown in FIG. 6B.

Figure 6C:
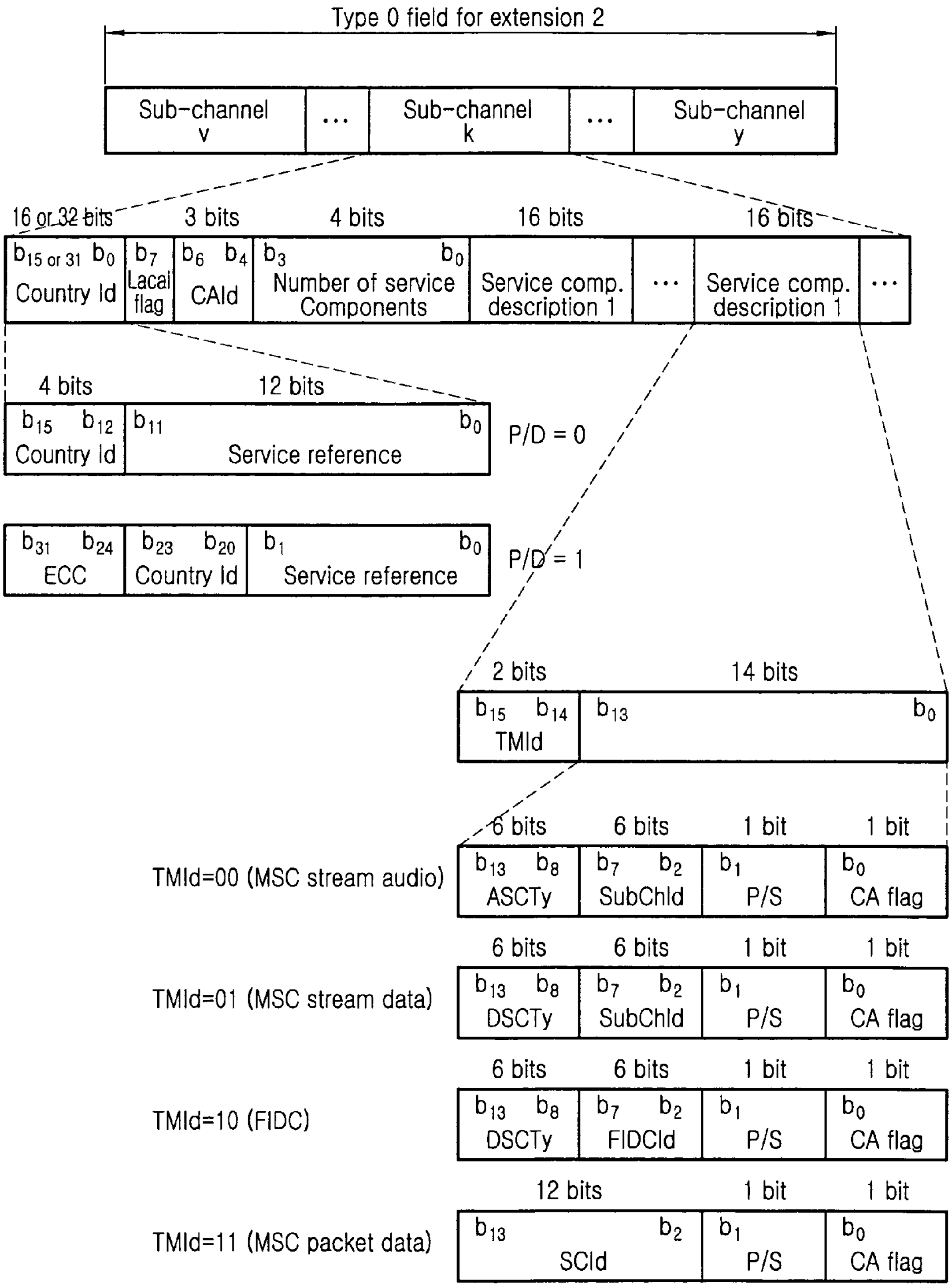

FIG. 6C illustrates the structure of a service organization field including information regarding a basic service and service components when the FIG has a type of 0 and an extension of 2. The mobile communication terminal 100 can understand a service ID, a data type (i.e., video, audio and data) of a service and a sub-channel ID through the structure shown in FIG. 6C.

Figure 6D:
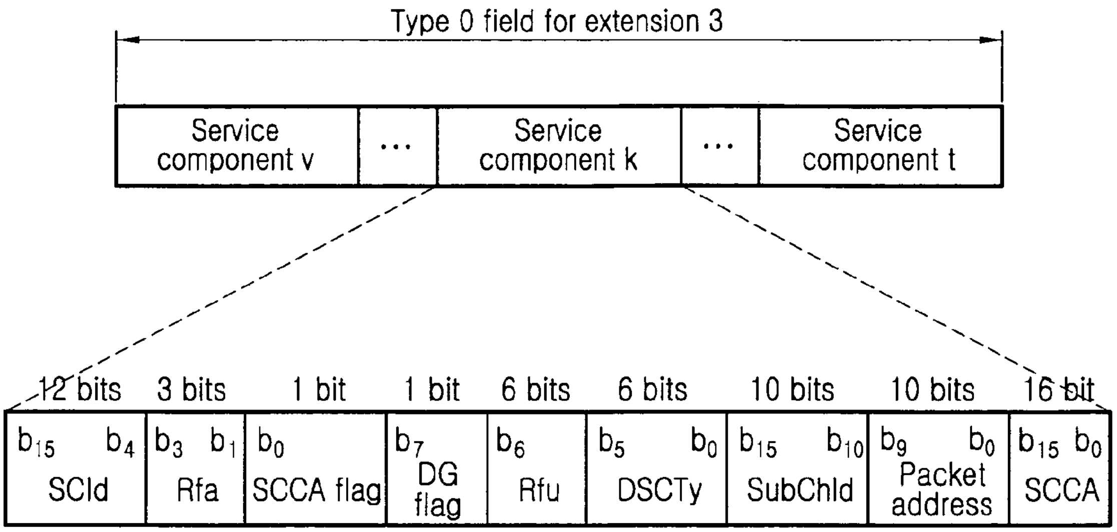

FIG. 6D illustrates the field structure of a service component including information regarding service components in a packet mode when the FIG has a type of 0 and an extension of 3. The mobile communication terminal 100 can understand a sub-channel ID for a service ID, a service type, a service component ID, and a packet address through the structure shown in FIG. 6D.

Figure 6E:
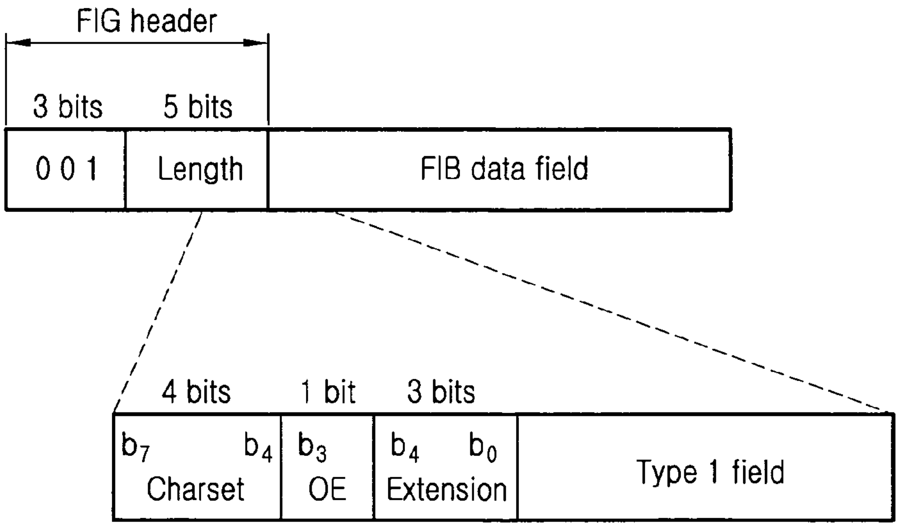

FIG. 6E illustrates the data field structure of the FIG type 1. The FIG type 1 may be classified into about 6 types by an extension. When the FIG has a type of 1, information required when the controller of the mobile communication terminal creates the user interface according the present invention includes extensions 0, 1 and 5. Accordingly, only the extensions 0, 1 and 5 will be described.

Figure 6F:
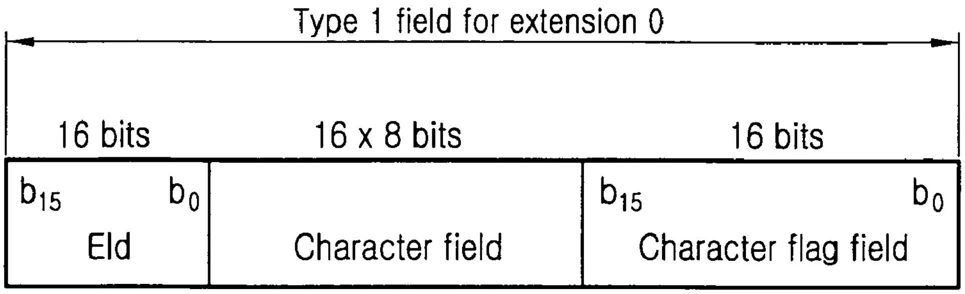

FIG. 6F illustrates the structure of an ensemble label field including information regarding an ensemble label when the FIG has a type of 1 and an extension of 0. The mobile communication terminal 100 determines the ensemble label of the user interface through the structure shown in FIG. 6F.

Figure 6G:
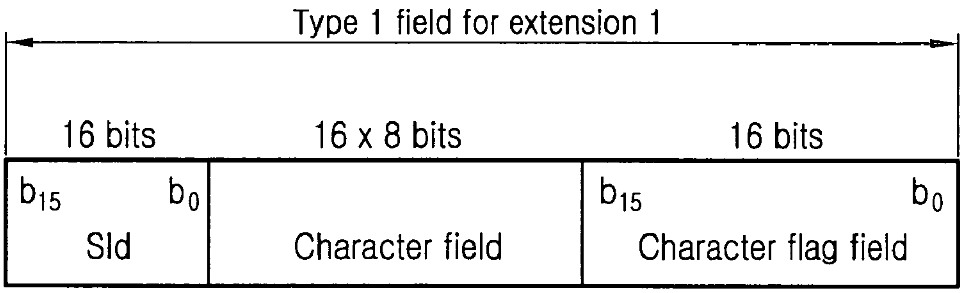

FIG. 6G illustrates the structure of a service label field including information regarding a program service (i.e., an audio service) label when the FIG has a type of 1 and an extension of 1. The mobile communication terminal 100 determines the program service label of the user interface through the structure shown in FIG. 6G.

Figure 6H:
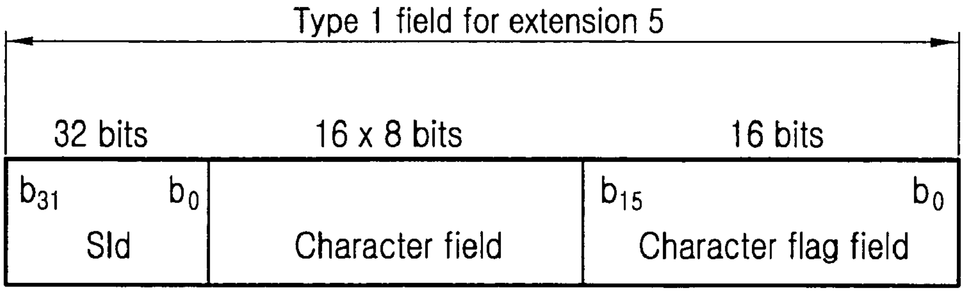

FIG. 6H illustrates the structure of a data service label field including information regarding a data service (i.e., video, audio and data services) label when the FIG has a type of 1 and an extension of 5. The mobile communication terminal 100 determines the data service label of the user interface through the structure shown in FIG. 6H.

In the embodiment of the present invention, it is assumed that the mobile communication terminal 100 can receive the six pieces of information (i.e., the combinations of the type and the extension are 0/1, 0/2, 0/3, 1/0, 1/1 and 1/5) necessary for creating the user interface from all broadcasting stations transmitting terrestrial digital broadcasting within 960 ms (96 ms*10 frames). The 960 ms may change according to the transmission patterns of the broadcasting stations. However, in general the transmission patterns of each broadcasting station are repeated with a time cycle of 10 frames.

The mobile communication terminal 100 stores the six information in the memory through The structures shown in FIGS. 5A and 5B and FIGS. 6A to 6H, and arranges the stored information, thereby creating the user interface.

Hereinafter, the method by which the mobile communication terminal 100 acquires the analysis information by analyzing the FICs will be described with reference to FIG. 4, FIGS. 5A and 5B and FIGS. 6A to 6H.

Figure 7A:
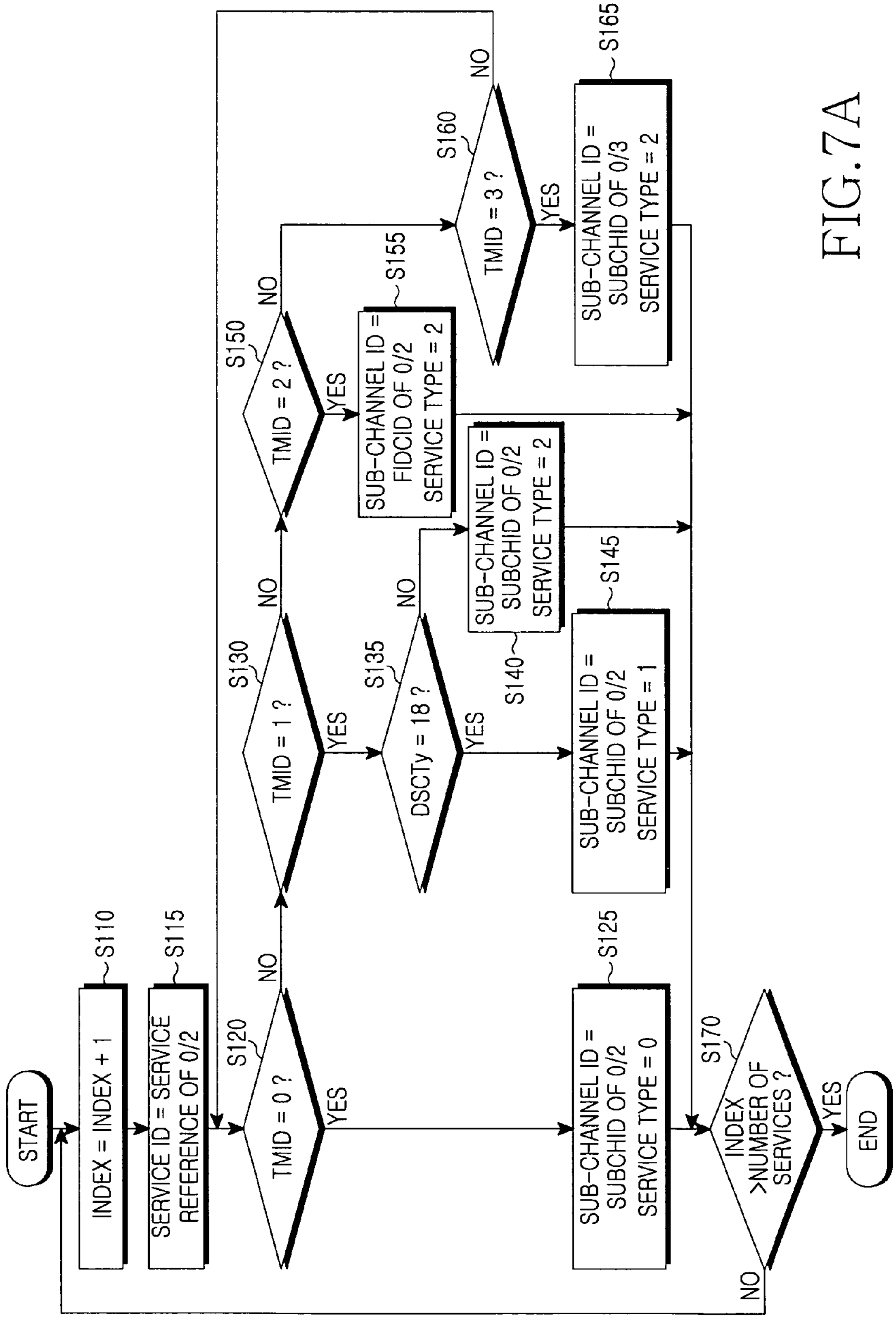
FIGS. 7A to 7C are flow charts illustrating processes by which a mobile communication terminal according to an embodiment of the present invention acquires analysis information by analyzing FICs in FIGS. 6A to 6H.
Figure 7B:
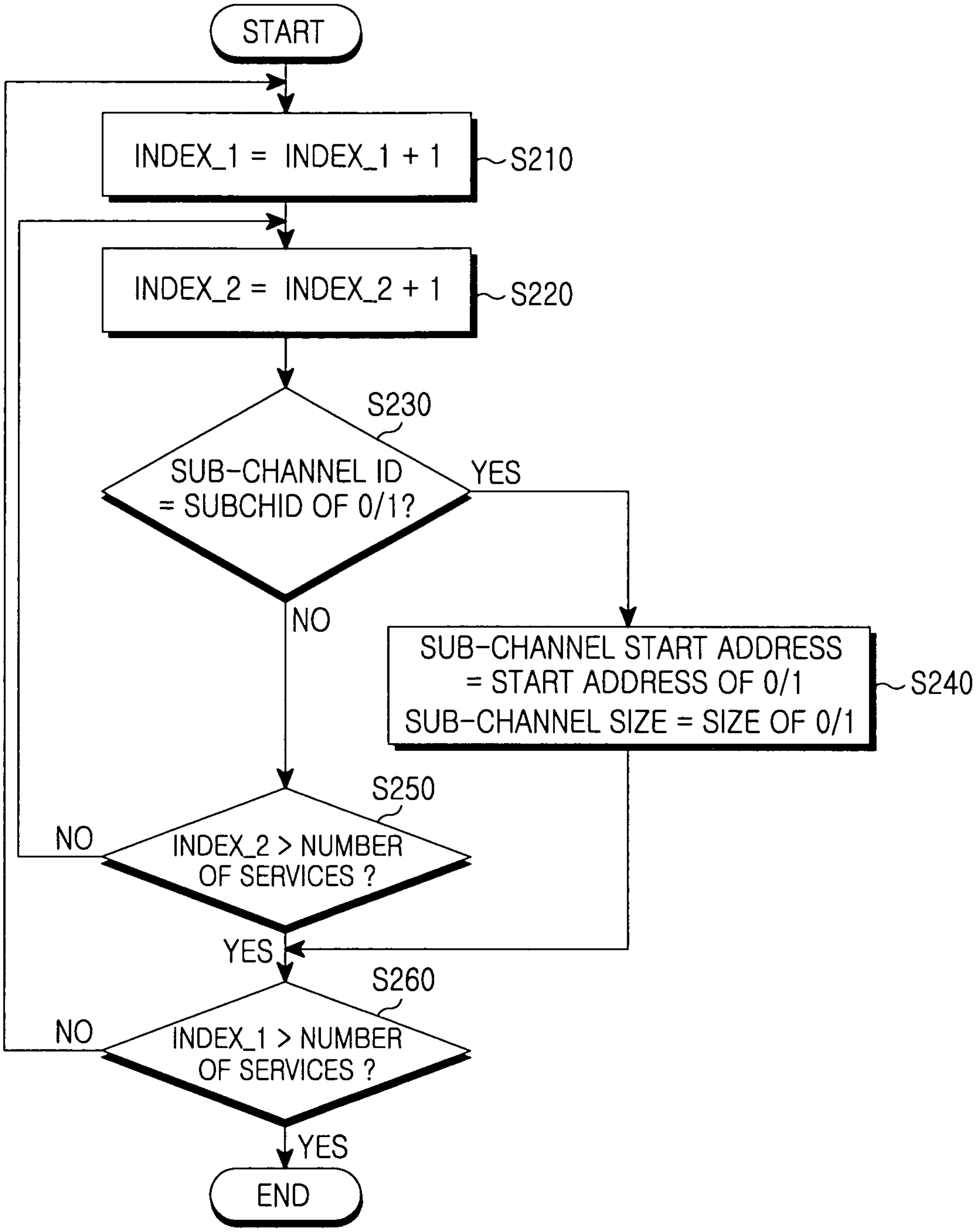
Figure 7C:
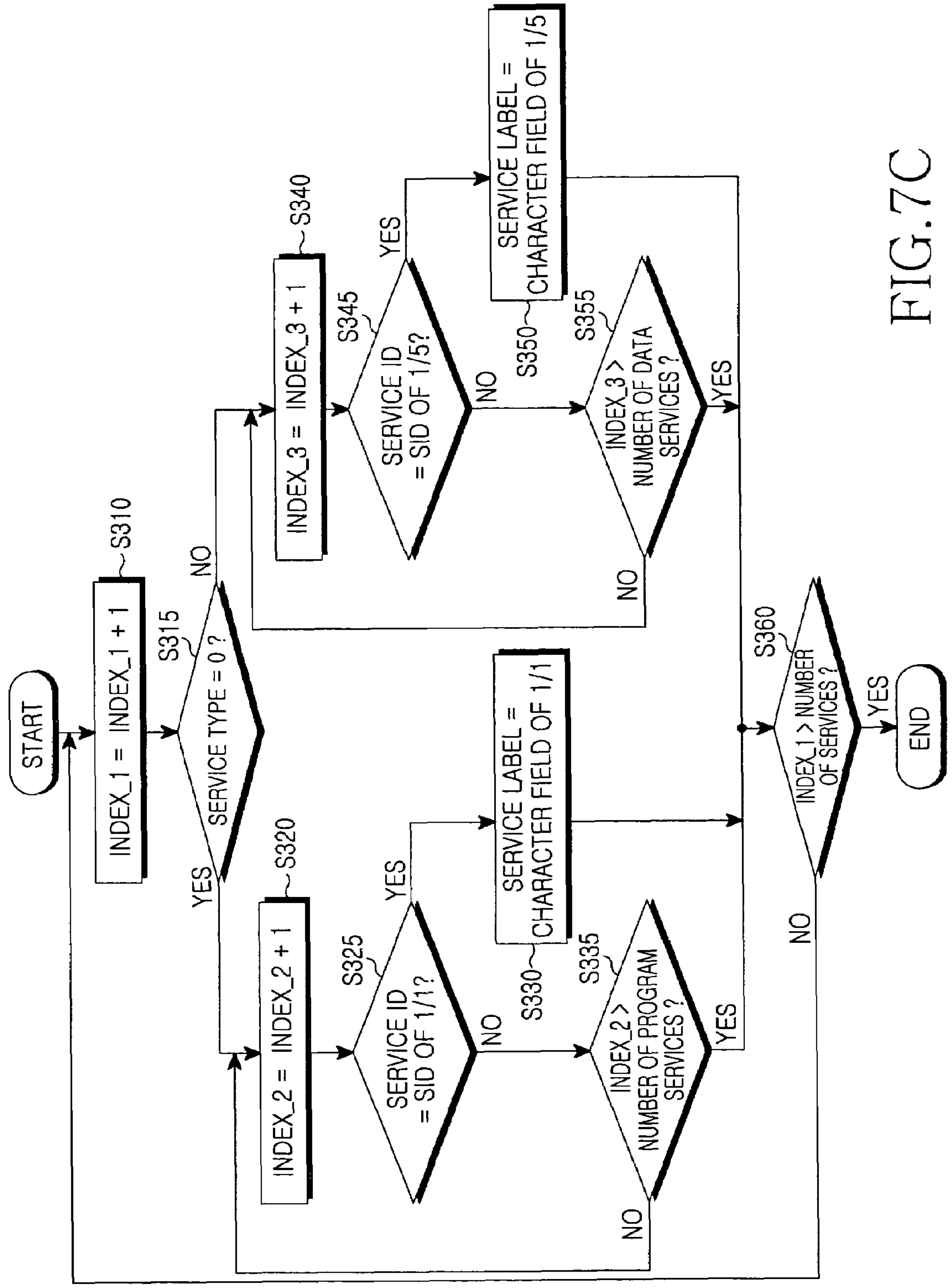

FIGS. 7A to 7C are flow charts illustrating processes by which the mobile communication terminal 100 acquires the analysis information by analyzing the FICs of FIGS. 6A to 6H according to the present invention.

The mobile communication terminal according to the present invention must acquire the analysis information by analyzing the FIGs, in which the combinations of the type and the extension are 0/1, 0/2, 0/3, 1/0, 1/1 and 1/5, in order to create the user interface menu as described above. The analysis information includes the ensemble label, the service label, the service ID, the service data type, the sub-channel ID, the sub-channel start address, and the sub-channel size. The service label is comprised of the program service (e. g., the audio service) label and the data service (e. g., the video, audio and data services) label.

First of all, the mobile communication terminal according to the present invention must determine the number of services from the analysis information. However, because the FIG does not have information for indicating the number of services, the mobile communication terminal computes the number of services by means of the number of service IDs acquired from the FIG having a type of 0 and an extension of 2. Then, the mobile communication terminal acquires entire analysis information by connecting the service IDs to information relating to these service IDs.

The mobile communication terminal determines the service type by means of a Transport Mechanism Identifier (TMId) and a Data Service Component Type (DSCTy) of the FIG having a type of 0 and an extension of 2 as illustrated in FIG. 6C. In the TMId, 00 represents audio in a stream mode, 01 represents data in a stream mode, 10 represents data of the FIC, and 11 represents data in a packet mode. Further, digital broadcasting (e.g., DMB) is included in the data in the stream mode. The DSCTy represents the data service component type and the detailed description will be omitted because it is disclosed in a DAB specification. For example, when the TMId is 0, the service type represents an audio type. When the TMId is 1 and the DSCTy is 0x18, the service type represents a video type. When the TMId is 2, the service type represents a data type. Further, the mobile communication terminal can acquire the sub-channel ID by means of an SubChId.

When the TMId is 3, the service type represents a packet type. In this case, the mobile communication terminal can acquire the sub-channel ID from the SubChId of the FIG having a type of 0 and an extension of 3.

FIG. 7A is a flow chart illustrating the process by which the mobile communication terminal according to the present invention acquires the analysis information by analyzing the FIG having a type of 0 and an extension of 2 as illustrated in FIG. 6C. That is, the mobile communication terminal repeats a loop by the number of services through the process of FIG. 7A, thereby acquiring a service ID and determining service types and sub-channel IDs included in the FIG which has a type of 0 and an extension of 2, and the FIG, which has a type of 0 and an extension of 3, through the TMId. It is preferred that the mobile communication terminal separately stores a service ID, a sub-channel ID and data of a service type whenever the loop is repeated according to increase of each INDEX value. That is, the service ID, the sub-channel ID and the service type are expressed by the service ID [INDEX], the sub-channel ID [INDEX] and the service type [INDEX] by program for storage, respectively. The service ID is not used for creating the user interface, but used for mapping the service label.

Referring to FIG. 7A, the mobile communication terminal adds 1 to an INDEX value having an initial value of 0 (S110). In order to acquire a service ID, the mobile communication terminal employs a service reference (in 0/2, the service reference represents a service ID) of the FIG having a type of 0 and an extension of 2 (S115) as the service ID. Herein, the mobile communication terminal can understand the number of services by acquiring the number of service IDs.

Then, the mobile communication terminal checks the TMId. When the TMId is 0 (S120), the mobile communication terminal determines the service type as 0, and employs the SubChId of the FIG having a type of 0 and an extension of 2 as the sub-channel ID (S125).

Then, when the INDEX value 1 is smaller than the number of services (S170), the procedure returns to S110.

As a result of the check of the TMId, when the TMId is 1 (S130), the mobile communication terminal determines if the DSCTy is 18 (S135). As a result of the determination, when the DSCTy is not 18, the mobile communication terminal determines the service type as 2, and employs the SubChId of the FIG having a type of 0 and an extension of 2 as the sub-channel ID (S140). However, when the DSCTy is 18, the mobile communication terminal determines the service type as 1, and employs the SubChId of the FIG having a type of 0 and an extension of 2 as the sub-channel ID (S145).

When the INDEX value 1 is smaller than the number of services (S170), the procedure returns to S110.

As a result of the TMId check, when the TMId is 2 (S150), the mobile communication terminal determines the service type as 2, and employs the Fast Information Data Channel Identifier (FIDCId which represents data of the FIC) of the FIG having a type of 0 and an extension of 2 as the sub-channel ID (S155). When the INDEX value 1 is smaller than the number of services (S170), the procedure returns to S110.

When the TMId is 3 (S160), the mobile communication terminal determines the service type as 2, and employs the SubChId of the FIG having a type of 0 and an extension of 3 as the sub-channel ID (S165). When the TMId is not 3 (S165), the procedure returns to S120. When the TMId is 3, the mobile communication terminal uses an SCId because the SubChId does not exist in the FIG having a type of 0 and an extension of 2. That is, the mobile communication terminal acquires the sub-channel ID from data having the same SCId as the SCId from among data of the FIG having a type of 0 and an extension of 3. When the INDEX value 1 is smaller than the number of services (S170), the procedure returns to S110.

In FIG. 7A, the mobile communication terminal acquires the analysis information by repeating the afore-described steps until the INDEX value exceeds the computed number of services.

The mobile communication terminal can acquire the sub-channel ID by means of the SubChId of the FIG having a type of 0 and an extension of 1 as illustrated in FIG. 6B. The mobile communication terminal compares the SubChId with the sub-channel ID acquired from the FIG having a type of 0 and an extension of 2, thereby acquiring the sub-channel start address and the sub-channel size corresponding to the SubChId.

FIG. 7B is a flow chart illustrating the process by which the mobile communication terminal according to the embodiment of the present invention acquires the analysis information by analyzing the FIG having a type of 0 and an extension of 1 as illustrated in FIG. 6B.

Because the mobile communication terminal has acquired the sub-channel IDs for each service in FIG. 7A, the mobile communication terminal acquires a sub-channel start address and a sub-channel size for the sub-channel ID acquired by analyzing the FIG having a type of 0 and an extension of 1, in FIG. 7B.

Referring to FIG. 7B, two INDEX values INDEX_1 and INDEX_2 in S210 and S220 represent an iterative statement is used twice and it is assumed that the INDEX_1 and INDEX_2 have an initial value of 0, respectively.

The mobile communication terminal determines if a SubChId identical to the sub-channel ID acquired in FIG. 7A exists in the FIG having a type of 0 and an extension of 1 (S230). The mobile communication terminal continuously increases the INDEX_2 value one by one and repeats S220, S230, S240 and S250 until the mobile communication terminal finds out the SubChId identical to the acquired sub-channel ID. When the increased INDEX_2 value exceeds the number of services (S250), the procedure proceeds to S260.

As a result of the check in S230, when the SubChId identical to the sub-channel ID acquired in FIG. 7A exists in the FIG having a type of 0 and an extension of 1, the mobile communication terminal puts a start address and a size of the FIG having a type of 0 and an extension of 1 into a sub-channel start address and a sub-channel size (S240). Then, the procedure proceeds to S260.

The mobile communication terminal repeats the afore-described steps until the INDEX_1 value exceeds the number of services (S260). That is, the mobile communication terminal repeatedly compares a sub-channel ID for one service with the SubChId of the FIG having a type of 0 and an extension of 1 by the number of services through an internal iteration INDEX_2, and performs the internal iteration for each service through an external iteration INDEX_1.

The mobile communication terminal acquires an ensemble label from the FIG having a type of 1 and an extension of 0 as illustrated in FIG. 6F by means of a character field (i.e., a character sequence). The ensemble label can be directly acquired without a separate process because it has no relation to other data.

The mobile communication terminal acquires information of a service label from the FIG having a type of 1 and an extension of 1 as illustrated in FIG. 6G and the FIG having a type of 1 and an extension of 5 as illustrated in FIG. 6H. The mobile communication terminal compares the service ID acquired from the FIG having a type of 0 and an extension of 2 as illustrated in FIG. 6C with SIds of the FIG having a type of 1 and an extension of 1 and the FIG having a type of 1 and an extension of 5, thereby acquiring a service label corresponding to the SId. Because the terrestrial digital broadcasting is a provision created by adding images to a DAB, which is digital audio broadcasting in Europe, a service may be classified into programs (audios) and data based on the DAB. Further, because digital broadcasting (i.e., DMB) is created by adding a video service to a data service, a service label may be classified into a program label and a data label.

The service label is separately received in the FIG having a type of 1 and an extension of 1 and the FIG having a type of 1 and an extension of 5. Accordingly, the FIG having a type of 1 and an extension of 1 includes information for the program service label and the FIG having a type of 1 and an extension of 5 includes information for the data service label.

FIG. 7C is a flow chart illustrating the process by which the mobile communication terminal according to the present invention acquires the analysis information by analyzing the FIGs as illustrated in FIGS. 6G and 6H, and performs an external iteration of an INDEX_1 and an internal iteration of an INDEX_2 and an INDEX_3. It is assumed that the INDEX_1, the INDEX_2 and the INDEX_3 have an initial value of 0, respectively.

Referring to FIG. 7C, the mobile communication terminal adds 1 to an INDEX_1 value having an initial value of 0 (S310).

The mobile communication terminal determines if the service type acquired in FIG. 7A is 0 (i.e., the audio type) (S315). When the service type is 0, the mobile communication terminal adds 1 to an INDEX_2 value (S320). It is assumed that the INDEX_2 has an initial value of 0.

The mobile communication terminal determines if an SId identical to the service ID acquired in FIG. 7A exists in the FIG having a type of 1 and an extension of 1 (S325). The mobile communication terminal continuously increases the INDEX_2 value one by one until the mobile communication terminal finds out the SId identical to the service ID, and repeats S320, S325, S330 and S335 until the increased INDEX_2 value exceeds the number of program services. When the increased INDEX_2 value exceeds the number of program services (S335), the procedure proceeds to S360.

When the SId identical to the service ID exists in the FIG having a type of 1 and an extension of 1 in S325, the mobile communication terminal employs a character field of the FIC having a type of 1 and an extension of 1 as program service label information (S330).

When the service type is not 0 in S315, the mobile communication terminal adds 1 to an INDEX_3 value (S340). It is also assumed that the INDEX_3 has an initial value of 0. Further, the case where the service type is not 0 in S315 corresponds to a case where the service type is 1 (i.e., the video type) or 2 (i.e., the data type). Because a case where the service type is 1 or 2 represents a data service, the FIG having a type of 1 and an extension of 5 includes data service label information.

The mobile communication terminal determines if the SId identical to the service ID acquired in FIG. 7A exists in the FIG having a type of 1 and an extension of 5 (S345). The mobile communication terminal continuously increases the INDEX_3 value one by one until the mobile communication terminal finds out the SId identical to the service ID, and repeats S340, S345, S350 and S355 until the increased INDEX_3 value exceeds the number of data services. When the increased INDEX_3 value exceeds the number of data services (S355), the procedure proceeds to S360.

When the SId identical to the service ID exists in the FIG having a type of 1 and an extension of 5 in S345, the mobile communication terminal employs a character field of the FIC having a type of 1 and an extension of 5 as data service label information (S350).

Then, the mobile communication terminal compares the INDEX_1 value with the number of services (S360). When the INDEX_1 value does not exceed the number of services in S360, the mobile communication terminal returns to S310 for increasing the INDEX_1 value one by one and repeats the afore-described steps. However, when the INDEX_1 value exceeds the number of services, the procedure ends.

As described above, the mobile communication terminal according to the embodiment of the present invention can acquire the analysis information by analyzing the FICs.

Figure 8:
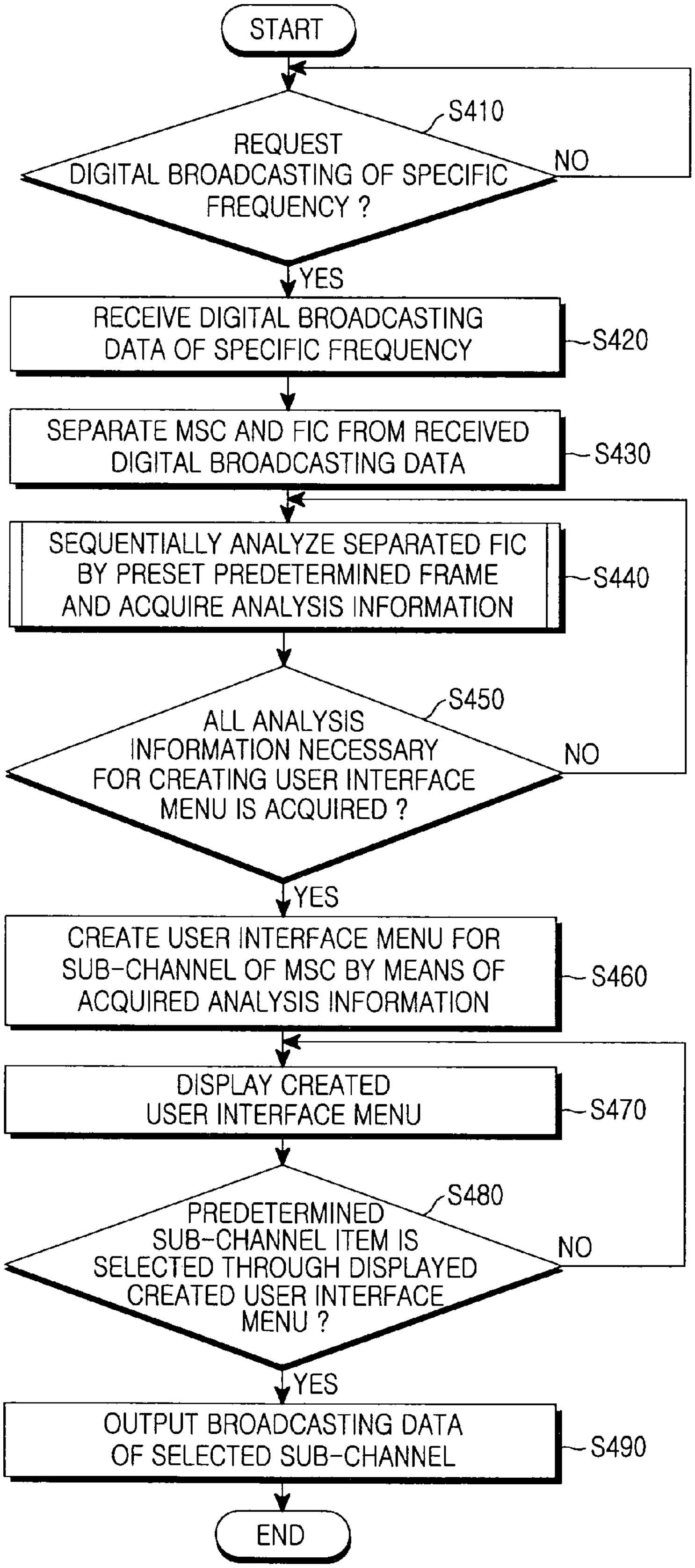
FIG. 8 is a flow chart illustrating a process by which a mobile communication terminal according to an embodiment of the present invention receives terrestrial digital broadcasting data and creates a user interface.

FIG. 8 is a flow chart illustrating the process by which the mobile communication terminal according to the embodiment of the present invention receives the terrestrial digital broadcasting data and creates the user interface.

Referring to FIGS. 4 and 8, the controller 170 determines if request for digital broadcasting corresponding to a specific frequency transmitted from a predetermined broadcasting station (e.g., KBS) is received from a user (S410).

When the request is received from the user, the controller 170 transmits corresponding broadcasting station information (i.e., the frequency information of the corresponding broadcasting station) stored in the memory 180 to the multimedia unit 140, and the multimedia unit 140 sets the frequency of the digital broadcasting receiver 110. Accordingly, the digital broadcasting receiver 110 can receive digital broadcasting data of a broadcasting station desired by the user.

When the digital broadcasting data of the requested frequency are received in the digital broadcasting receiver 110 (S420), the demodulator 120 separates an MSC and FICs from the received digital broadcasting data (S430).

Then, the controller 170 sequentially receives the separated FICs from the multimedia unit 140 by the preset predetermined frames (e.g., two frames) each time, analyzes the received FICs, and acquires the analysis information (S440). The reason that the controller 170 sequentially receives the separated FICs from the multimedia unit 140 by the predetermined frames each time and analyzes the received FICs is for efficiently analyzing the FICs.

Table 1 below shows the transmission pattern of the FIC data of a predetermined broadcasting station.

TABLE 1

| FIB | 0 | 1 | 2 | 3 | 4 | 5 | 6 | 7 | 8 | 9 |
|---|---|---|---|---|---|---|---|---|---|---|
| 0 | 0/0<br>0/1 | 0/0<br>0/1 | 0/0<br>0/1 | 0/0<br>0/1 | 0/0<br>0/1 | 0/0<br>0/1 | 0/0<br>0/1 | 0/0<br>0/1 | 0/0<br>0/1 | 0/0<br>0/1 |
| 1 | | | | | | | | | | |
| 2 | | | | | | | | | | |
| 3 | 0/2<br>0/2 | 0/2<br>0/2 | 0/2<br>0/2 | 0/2<br>0/2 | 0/2<br>0/2 | 0/2<br>0/2 | 0/2<br>0/2 | 0/2<br>0/2 | 0/2<br>0/2 | 0/2<br>0/2 |
| 4 | | | | | | | | | | |
| 5 | | | | | | | | | | |
| 6 | 0/2<br>0/3 | 0/2<br>0/3 | 0/2<br>0/3 | 0/2<br>0/3 | 0/2<br>0/3<br>0/8 | 0/2<br>0/3<br>0/5 | 0/2<br>0/3 | 0/2<br>0/3<br>0/5<br>0/5 | 0/2<br>0/3 | 0/2<br>0/3 |
| 7 | | | | | | | | | | |
| 8 | | | | | | | | | | |
| 9 | 1/5 | 0/18<br>0/9 | | 0/5<br>1/5 | | 0/8 | 1/0<br>0/5 | 1/1<br>0/17 | 1/5 | 1/5 |
| 10 | | | | | | | | | | |
| 11 | | | | | | | | | | |

In Table 1, one transmission frame is 96 ms and 12 FIBs exist in one frame. Further, the horizontal direction represents the number of transmission frames and the vertical direction represents the number of blocks in one transmission frame. In general, the digital broadcasting data of each broadcasting station are repeated in a broadcasting pattern with a time cycle of 10 frames, and the information of which is sufficient for analyzing the FIC.

This is because all of the six information items (i.e., the combinations of the FIC type and the extension are 0/1, 0/2, 0/3, 1/0, 1/1 and 1/5) required when the user interface menu is created in the present invention exist in the FIC of the 10 frames as shown in table 1.

Referring to Table 1 in more detail, it may be understood that the information of 0/1, 0/2 and 0/3 regularly exists in every frame, but the information of 1/0, 1/1 and 1/5 marked by shades does not exist in every frame and is not regular. However, it may be understood that the information of 1/0, 1/1 and 1/5 exists in the information of the 10 frames (i.e., 960 ms) at least once. Accordingly, when the information of 10 continuous frames is acquired, there is no problem in analyzing the FIC data.

The problem in analyzing the FIC according to the present invention is the information of 1/0, 1/1 and 1/5. If the information of 1/0, 1/1 and 1/5 exists in front of the 10 frames, it is necessary to analyze information of only several frames and it is not necessary to analyze the other information. Accordingly, when the FIC data are analyzed by the predetermined frames (e.g., two frames) each time, it is possible to analyze the FIC data stably and efficiently.

Further, the multimedia unit 140 may also continuously transfer the separated FIC to the controller 170 during the 10 frames (i.e., 960 ms). This is because the controller 170 can receive the six information items (i.e., the combinations of the FIC type and the extension are 0/1, 0/2, 0/3, 1/0, 1/1 and 1/5) necessary for creating the user interface from all broadcasting stations transmitting the terrestrial digital broadcasting within 960 ms (96 ms*10 frames) as described above.

Further, it is preferred that the controller 170 extracts only the analysis information (i.e., the six information items) acquired by analyzing the FIC data of 960 ms, stores the extracted analysis information in the memory 180, and deletes the previously acquired information.

The controller 170 determines if all analysis information necessary for creating the user interface menu has been acquired (S450). When all analysis information has not been acquired, S440 is again performed. That is, the controller 170 repeats the process for sequentially receiving the FICs from the multimedia unit 140 by the preset predetermined frames (e.g., two frames) each time, analyzing the received FICs, and acquiring the analysis information.

However, when all analysis information has been acquired, the controller 170 creates the user interface menu for the sub-channel of the MSC by means of the acquired analysis information (S460).

The controller 170 displays the created user interface menu on the display unit 130 (S470). The controller 170 then determines if a predetermined sub-channel has been selected through the displayed created user interface menu (S480).

As a result of the determination, when the predetermined sub-channel item (e.g., a video channel) has been selected, the controller 170 controls the multimedia unit 140 to output the broadcasting data (e.g., movies) of the selected sub-channel through the display unit 130 and the audio processor 150 (S490). That is, when the predetermined sub-channel item has been selected in S480, the controller 170 detects information (e.g., a data type of the sub-channel and an ID for identifying the sub-channel) of the selected sub-channel from the memory 180, and transmits the detected information to the multimedia unit 140. Then, the multimedia unit 140 sets the received information in the demodulator 120, receives the corresponding broadcasting data, and outputs the broadcasting data through the display unit 130 and the audio processor 150.

In FIG. 8, the controller 170 analyzes the FIC. However, the multimedia unit 140 may also transmit the analysis information acquired by directly analyzing the FIC to the controller 170. Further, the multimedia unit 140 may also directly create the user interface menu by means of the analysis information without transmitting the analysis information to the controller 170, and display the user interface menu on the display unit 130.

Figure 9:
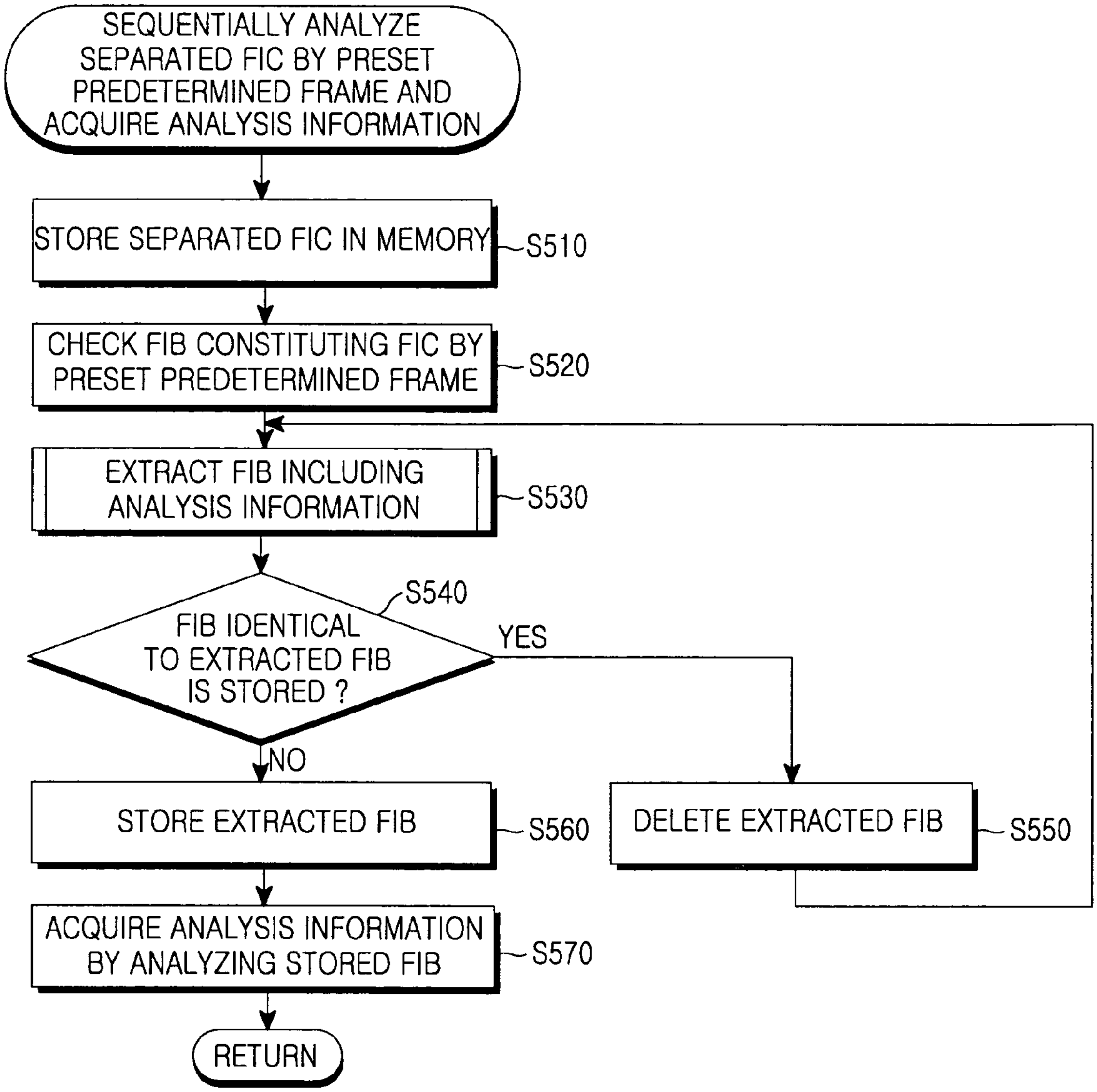
FIG. 9 is a flow chart illustrating a process for acquiring analysis information by analyzing FICs in the operation process of FIG. 8.

FIG. 9 is a flow chart illustrating the process for acquiring the analysis information by analyzing the FICs in the operation process of FIG. 8. FIG. 9 illustrates in detail step S440 for acquiring the analysis information by sequentially analyzing the FICs according to the preset predetermined frames each time in the operation process of FIG. 8.

Referring to FIGS. 4 and 9, when leading request for the FICs of 10 frames is received from the controller 170, the multimedia unit 140 stores the FICs of 10 continuous frames separated by the demodulator 120 in a memory (S510). It is preferred that this memory is separately included in the multimedia unit 140.

The controller 170 leads the stored FICs by the preset predetermined frames (e.g., two frames) each time, checks FIBs constituting the FICs (S520), and extracts the FIBs including the analysis information (S530). The controller 170 determines if FIBs identical to the extracted FIBs have been stored in the memory 180 (S540). As a result of the determination, when the FIBs identical to the extracted FIBs have been stored in the memory 180, the controller 170 deletes the extracted FIBs (S550). Then, the procedure returns to S530.

However, when the FIBs identical to the extracted FIBs have not been stored in the memory 180, the controller 170 stores the extracted FIBs in the memory 180 (S560). Then, the controller 170 analyzes the stored FIBs, thereby acquiring the analysis information (S570).

Figure 10:
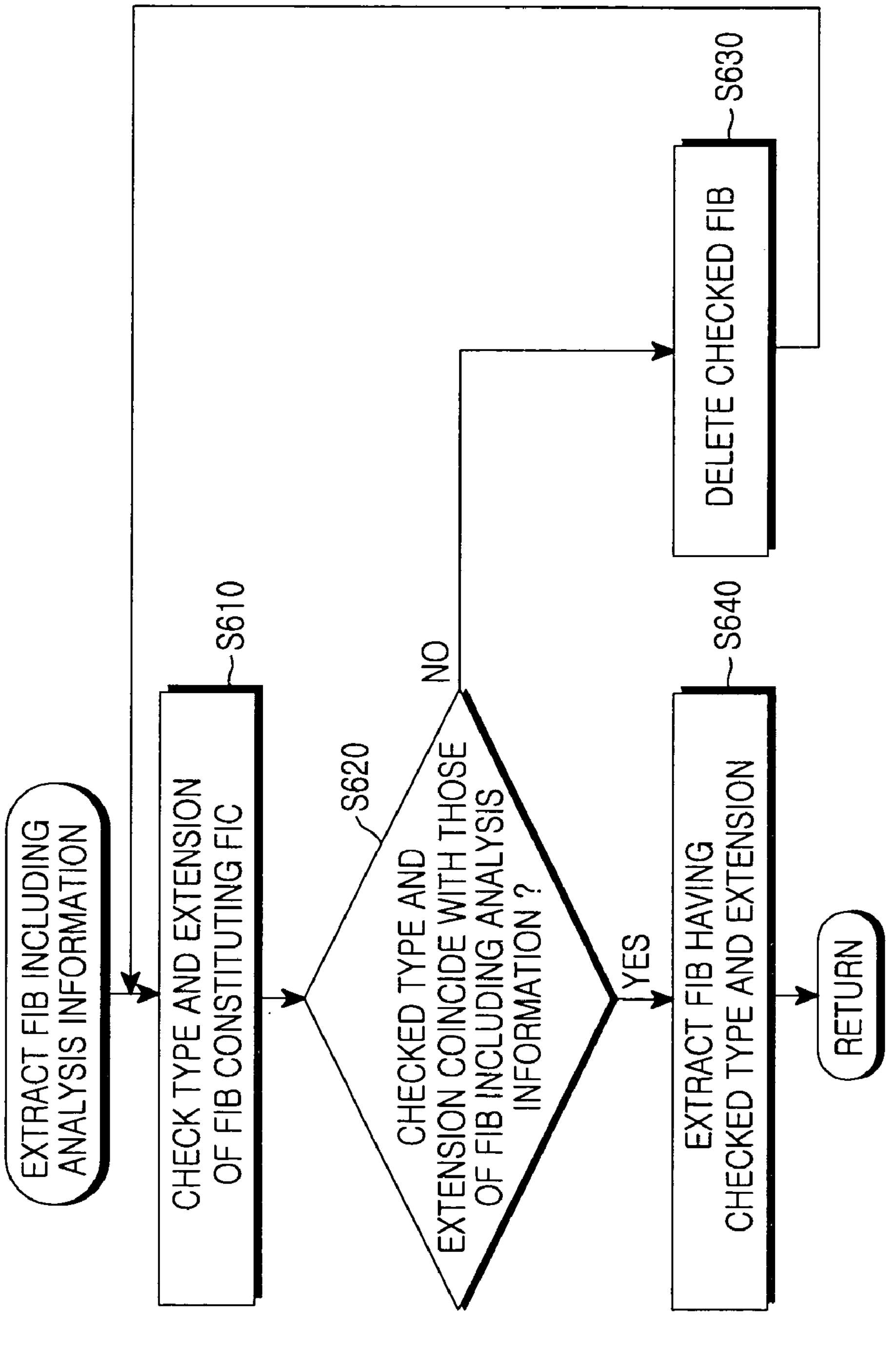
FIG. 10 is a flow chart illustrating a process for extracting an FIB including analysis information in the operation process of FIG. 9.

FIG. 10 is a flow illustrating the process for extracting the FIB including the analysis information in the operation process of FIG. 9. FIG. 10 illustrates in detail step 530 for extracting the FIB including the analysis information in the operation process of FIG. 9.

Referring to FIGS. 4 and 10, the controller 170 checks the type and the extension of each FIB constituting the FIC (S610).

The controller 170 determines if the checked type and extension coincide with those of the FIB including the analysis information (S620). That is, the controller 170 determines if a combination of the checked type and extension coincide with one of 0/1, 0/2, 0/3, 1/0, 1/1 and 1/5.

When the checked type and extension do not coincide with those of the FIB including the analysis information, the controller 170 deletes the checked FIB (S630). The procedure returns to S610.

However, when the checked type and extension coincide with those of the FIB including the analysis information, the controller 170 extracts an FIB having the checked type and extension (S640).

Figure 11A:
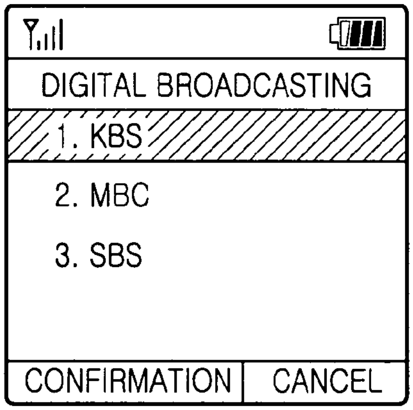
FIGS. 11A to 11C illustrates an operation process of a mobile communication terminal according to an embodiment of the present invention.
Figure 11B:
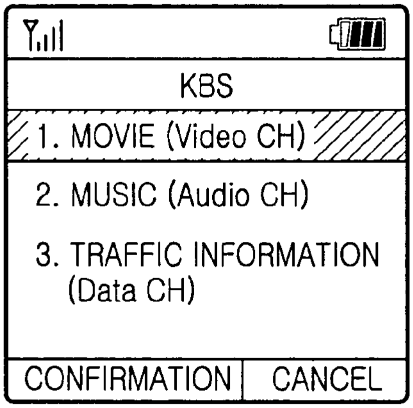
Figure 11C:

FIGS. 11A to 11C illustrates the operation process of the mobile communication terminal according to the present invention.

FIGS. 11A to 11C will be described with reference to FIGS. 8 to 10.

FIG. 11A is an example of a screen displayed when a user selects a broadcasting station from which the user will receive digital broadcasting data by means of the mobile communication terminal. In the present invention, it is assumed that the number of terrestrial digital broadcasters is three (i.e., MBC, KBS and SBS) and the mobile communication terminal basically has a main user interface corresponding to three frequencies in FIG. 11A.

In FIG. 11A, when an item "1. KBS" is selected by the key input of the user and a confirmation key is input, the mobile communication terminal displays the user interface menu for the sub-channel of the digital broadcasting data transmitted from the selected broadcasting station "KBS" on a screen through S410, S420, S430, S440, S450, S460 and S470 of FIG, 8 as illustrated in FIG. 11B.

The sub-channel items as illustrated in FIG. 11B include a "1. movie (video CH)", a "2. music (audio CH)" and a "3. traffic information (data CH)".

When the item "1. movie (video CH)" is selected from these sub-channel items and the confirmation key is input, the mobile communication terminal outputs the broadcasting data (i.e., movie) of the selected sub-channel on the screen through S480 and S490 as illustrated in FIG. 11C.

As described above, the present invention provides a method by which a mobile communication terminal receives terrestrial digital broadcasting data and efficiently creates a user interface, thereby enabling users to conveniently watch terrestrial digital broadcasting through the mobile communication terminal.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for creating a user interface in a mobile communication terminal receiving terrestrial digital broadcasting data, the method comprising the steps of:

receiving digital broadcasting data corresponding to a specific frequency in response to a request for digital broadcasting corresponding to the specific frequency;

separating a Main Service Channel (MSC) including broadcasting data according to each sub-channel and a Fast Information Channel (FIC) representing information of the MSC;

acquiring analysis information by sequentially analyzing the separated FIC by a preset predetermined number of frames each time; and creating a user interface menu for sub-channels of the MSC by means of the acquired analysis information.

2. The method as claimed in claim 1, wherein the analysis information includes an ensemble label representing at least one of a broadcasting station name, a program service label and a data service label representing a channel name, a service ID for identifying services, a service data type for identifying audio, video and data, an ID of a service component representing a factor constituting a service, a sub-channel ID for identifying sub-channels, a sub-channel start address, and a sub-channel size.

3. The method as claimed in claim 1, wherein the sub-channel includes a video channel, an audio channel and a data channel.

4. The method as claimed in claim 1, further comprising a step of displaying the created user interface menu.

5. The method as claimed in claim 1, further comprising a step of outputting broadcasting data of a predetermined sub-channel when the predetermined sub-channel is selected through the user interface menu for the sub-channels of the MSC.

6. The method as claimed in claim 5, wherein the step of outputting the broadcasting data comprises the sub-steps of:

when a predetermined sub-channel item is selected from items of the displayed user interface menu based on user selection information, detecting sub-channel information for the selected sub-channel item; and leading broadcasting data corresponding to the detected sub-channel information from the MSC and outputting the broadcasting data.

7. The method as claimed in claim 6, wherein the sub-channel information includes a data type of the sub-channel and an ID for identifying sub-channels.

8. The method as claimed in claim 1, wherein the digital broadcasting data are received repeatedly in a predetermined period.

9. The method as claimed in claim 8, wherein the predetermined period includes 10 frames.

10. The method as claimed in claim 1, wherein, the analysis information is acquired by analyzing the separated FIC by two frames each time.

11. The method as claimed in claim 1, wherein, in the step of acquiring, the FIG is sequentially analyzed by the preset predetermined number of frames each time until all analysis information for creating the user interface menu is acquired.

12. The method as claimed in claim 11, wherein, in the step of acquiring, the analysis of the FIG ends once the analysis information has been acquired.

13. The method as claimed in claim 1, wherein the step of acquiring the analysis information comprises:

storing the separated FIC in a memory;

acquiring the analysis information by sequentially analyzing the FIG by the preset predetermined number of frames each time; and ending the analysis of the FIC once the analysis information has been acquired.

14. The method as claimed in claim 13, wherein the step of acquiring the analysis information comprises:

checking Fast Information Blocks (FIBs) constituting the FIG by the preset predetermined number of frames each time and extracting FIBs including the analysis information;

storing the extracted FIBs; and acquiring the analysis information by analyzing the stored FIBs.

15. The method as claimed in claim 14, wherein the step of extracting the FIBs comprises:

checking a type and an extension of each FIB constituting the FIC;

determining if the checked type and extension coincide with a type and an extension of the FIB including the analysis information; and extracting an FIB having the checked type and extension when the checked type and extension coincide with the type and the extension of the FIB including the analysis information.

16. The method as claimed in claim 15, wherein the determination step comprises determining if the checked type and extension coincides with one of a case where a type is 0 and an extension is 1, a case where a type is 0 and an extension is 2, a case where a type is 0 and an extension is 3, a case where a type is 1 and an extension is 0, a case where a type is 1 and an extension is 1, and a case where a type is 1 and an extension is 5.

17. The method as claimed in claim 15, wherein the step of determining further comprises deleting the checked FIB when the type and the extension of the checked FIB does not coincide with the type and the extension of the FIB including the analysis information.

18. The method as claimed in claim 14, wherein the step of storing the extracted FIBs further comprises deleting the extracted FIBs a case where an FIB having a type and an extension equal to types and extensions of the extracted FIBs has been previously stored when the extracted FIBs are stored.

19. The method as claimed in claim 14, wherein, in the step of acquiring the analysis information, when the stored FIB has a type of 0 and an extension of 1, information for an ID, a start address and a size of a sub-channel is acquired by analyzing the stored FIB.

20. The method as claimed in claim 14, wherein, in the step of acquiring the analysis information, when the stored FIB has a type of 0 and an extension of 2, a service ID, a service data type and a sub-channel ID are acquired by analyzing the stored FIB.

21. The method as claimed in claim 14, wherein, in the step of acquiring the analysis information, when the stored FIB has a type of 0 and an extension of 3, a sub-channel ID, a service type and a service component ID for a service ID in a packet mode are acquired by analyzing the stored FIB.

22. The method as claimed in claim 14, wherein, in the step of acquiring the analysis information, when the stored FIB has a type of 1 and an extension of 0, an ensemble label is acquired by analyzing the stored FIB.

23. The method as claimed in claim 14, wherein, in the step of acquiring the analysis information, when the stored FIB has a type of 1 and an extension of 1, a program service label is acquired by analyzing the stored FIB.

24. The method as claimed in claim 14, wherein, in the step of acquiring the analysis information, when the stored FIB has a type of 1 and an extension of 5, a data service label is acquired by analyzing the stored FIB.

* * * * *

UNITED STATES PATENT AND TRADEMARK OFFICE

CERTIFICATE OF CORRECTION

PATENT NO. : 7,623,485 B2
APPLICATION NO. : 11/331224
DATED : November 24, 2009
INVENTOR(S) : Bae et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 850 days.

Signed and Sealed this

Twenty-sixth Day of October, 2010

David J. Kappos
*Director of the United States Patent and Trademark Office*